US012528166B2

(12) United States Patent
Moloznik

(10) Patent No.: US 12,528,166 B2
(45) **Date of Patent: *Jan. 20, 2026**

(54) MULTISTAGE SOLENOID FASTENER DEVICE WITH MAGNETIC DRIVER

(71) Applicant: STANLEY FASTENING SYSTEMS, L.P., North Kingstown, RI (US)

(72) Inventor: Luke Moloznik, Baltimore, MD (US)

(73) Assignee: STANLEY FASTENING SYSTEMS, L.P., North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,214

(22) Filed: Jul. 1, 2024

(65) Prior Publication Data

US 2024/0351177 A1 Oct. 24, 2024

Related U.S. Application Data

(63) Continuation of application No. 17/224,798, filed on Apr. 7, 2021, now Pat. No. 12,053,869.

(51) Int. Cl.
*B25C 1/06* (2006.01)

(52) U.S. Cl.
CPC ..................................... *B25C 1/06* (2013.01)

(58) Field of Classification Search
CPC ................................... B25C 1/06; B25C 5/15
See application file for complete search history.

(56) References Cited

U.S. PATENT DOCUMENTS

| | | | |
|---|---|---|---|
| 2,572,012 | A | 10/1951 | Curtis |
| 2,967,302 | A | 1/1961 | Loveless |
| 3,434,026 | A | 3/1969 | Doyle |
| 3,924,789 | A | 12/1975 | Avery et al. |
| 4,349,143 | A | 9/1982 | Ewig |

(Continued)

FOREIGN PATENT DOCUMENTS

| | | | |
|---|---|---|---|
| EP | 1952949 | A2 | 8/2008 |
| GB | 2374308 | A | 10/2002 |
| JP | 2013208695 | A | 10/2013 |

OTHER PUBLICATIONS

Stanley Electric Staple/Brad Nail Gun—TRE550, http://www.stanleytools.com/products/hand-tools/manual-fastener-tools/staplers-tackers/electric-staplebrad-nail-gun/tre550, 8 pages.

(Continued)

*Primary Examiner* — Joshua G Kotis
(74) *Attorney, Agent, or Firm* — Amir R. Rohani

(57) ABSTRACT

A fastener device includes a tool housing, a multistage solenoid, a magnetic driver, and a controller. The magnetic driver is configured to travel through the multistage solenoid between a retracted condition and an extended condition. The controller is contained within the tool housing and is configured to adjust an amount of force the multistage solenoid imparts on the magnetic driver while the magnetic driver travels between a first stage and a second stage of the at least two stages that are adjacent to each other, by combining a magnetic field of the magnetic driver with at least a portion of a first electromagnetic field of the first stage of the at least two stages of the multistage solenoid and at least a portion of a second electromagnetic field of the second stage of the at least two stages of the multistage solenoid.

16 Claims, 10 Drawing Sheets

(56) References Cited

U.S. PATENT DOCUMENTS

| | | | | |
|---|---|---|---|---|
| 5,497,555 | A | 3/1996 | Averbukh | |
| 6,364,193 | B1 | 4/2002 | Tsai | |
| 7,025,183 | B2 * | 4/2006 | Steffen ................. | B25D 11/064 188/267 |
| 7,537,145 | B2 | 5/2009 | Gross et al. | |
| 7,665,540 | B2 | 2/2010 | Gross et al. | |
| 7,913,890 | B2 | 3/2011 | Gross et al. | |
| 8,225,978 | B2 | 7/2012 | Gross et al. | |
| 8,353,435 | B2 | 1/2013 | Gross et al. | |
| 2004/0084503 | A1 | 5/2004 | Chen | |
| 2007/0125562 | A1 | 6/2007 | Chen | |
| 2010/0032468 | A1 | 2/2010 | Gross et al. | |
| 2010/0206593 | A1 | 8/2010 | Schad et al. | |
| 2023/0001555 | A1 | 1/2023 | Abu Antoun et al. | |
| 2023/0027749 | A1 | 1/2023 | Abu Antoun et al. | |

OTHER PUBLICATIONS

Extended European Search Report mailed Sep. 15, 2022 in corresponding EP application No. 22167012.8, 10 pages.

* cited by examiner

MULTISTAGE SOLENOID FASTENER DEVICE WITH MAGNETIC DRIVER

CROSS-REFERENCE TO RELATED APPLICATIONS

This application is a continuation of U.S. patent application Ser. No. 17/224,798, entitled MULTISTAGE SOLENOID FASTENER DEVICE WITH MAGNETIC DRIVER, filed Apr. 7, 2021, which is hereby incorporated by reference in its entirety.

FIELD

The present patent application relates to fastener devices and more particularly to a cordless fastener devices

BACKGROUND

Traditional fastener tools/devices can employ pneumatic actuation to drive a fastener into a workpiece. In these fastener devices, air pressure from a pneumatic system can be utilized to both drive the fastener into the workpiece and to reset the device after driving the fastener. It will be appreciated that, in the pneumatic fastener system, a hose and a compressor are required to accompany the fastener device. A combination of the hose, the tool/device and the compressor can provide for a large, heavy and bulky package that can be relatively inconvenient and cumbersome to transport.

Other traditional fastener devices can be battery powered and can engage a transmission and a motor to drive a fastener. Inefficiencies inherent in the transmission and the motor, however, can limit battery life.

A solenoid has been used in fastener devices to drive small fasteners. Typically, the solenoid executes multiple impacts on a single fastener to generate the force needed to drive the fastener into a workpiece. In other instances, corded fastener tools/devices, i.e., connected to wall voltage, can use a solenoid to drive the fastener in a single stroke but the energy requirements can be relatively large and are better suited to corded applications.

The present patent application provides improvements in the cordless or battery powered fastener devices.

SUMMARY

One aspect of the present patent application provides a fastener device that drives one or more fasteners into a workpiece. The fastener device includes a tool housing, a multistage solenoid, a magnetic driver, and a controller. The multistage solenoid is contained within the tool housing and has at least two stages. Each stage of the multistage solenoid is configured to be selectively energized to generate a first electromagnetic field and a second electromagnetic field. The second electromagnetic field has a polarity different from the first electromagnetic field. Each stage of the multistage solenoid is configured to be selectively de-energized to collapse the first electromagnetic field and the second electromagnetic field. The magnetic driver is configured to travel through the multistage solenoid between a retracted condition and an extended condition to drive a fastener of the one or more fasteners into the workpiece during a drive stroke. The magnetic driver has a magnetic field. The controller is contained within the tool housing and is configured to adjust an amount of force the multistage solenoid imparts on the magnetic driver while the magnetic driver travels between a first stage and a second stage of the at least two stages that are adjacent to each other, by combining the magnetic field of the magnetic driver with at least a portion of the first electromagnetic field of the first stage of the at least two stages of the multistage solenoid and at least a portion of the second electromagnetic field of the second stage of the at least two stages of the multistage solenoid.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION

Figure 1A:
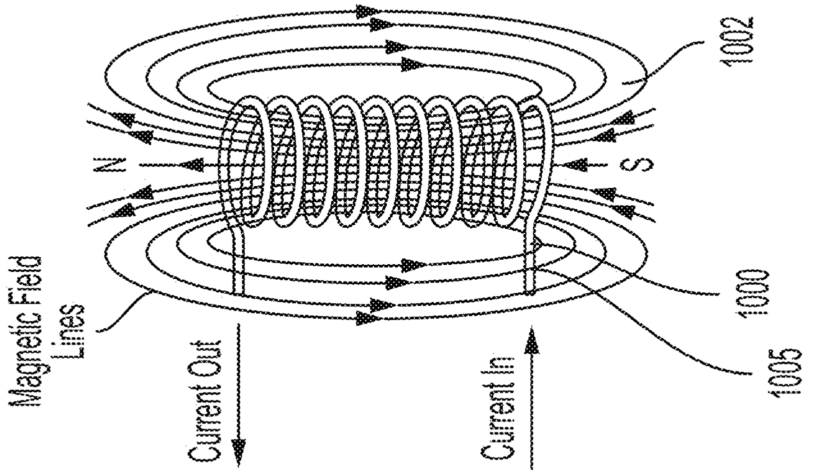
FIGS. 1A-1C show an exemplary solenoid system having a single stage solenoid with its electromagnetic field and a magnet with its magnetic field to show an interaction between the electromagnetic field of the solenoid and the magnetic field of the magnet.

In one embodiment of the present patent application, referring to FIGS. 2-6, a fastener device 100 that drives one or more fasteners 124 into a workpiece 126. The fastener device 100 includes a tool housing 122, a multistage solenoid 102, a magnetic driver 116, and a controller 120. The multistage solenoid 102 is contained within the tool housing 122 and has at least two stages 106, 108, 110. Each stage 106, 108, 110 of the multistage solenoid 102 is configured to be selectively energized to generate a first electromagnetic field 112 and a second electromagnetic field 114. The second electromagnetic field 114 has a polarity different from the first electromagnetic field 112. Each stage 106, 108, 110 of the multistage solenoid 102 is configured to be selectively de-energized to collapse the first electromagnetic field 112 and the second electromagnetic field 114. The magnetic driver 116 is configured to travel through the multistage solenoid 102 between a retracted condition and an extended condition to drive a fastener 124 of the one or more fasteners 124 into the workpiece 126 during a drive stroke. The magnetic driver 116 has a magnetic field 118. The controller 120 is contained within the tool housing 122 and is configured to adjust an amount of force the multistage solenoid 102 imparts on the magnetic driver 116 while the magnetic driver 116 travels between a first stage 106 or 108 and a second stage 108 or 110 of the at least two stages 106, 108, 110 that are adjacent to each other, by combining the magnetic field 118 of the magnetic driver 116 with at least a portion of the first electromagnetic field 112 of the first stage 106 or 108 of the at least two stages 106, 108, 110 of the multistage solenoid 102 and at least a portion of the second electromagnetic field 114 of the second stage 108 or 110 of the at least two stages 106, 108, 110 of the multistage solenoid 102.

In one embodiment, the fastener device 100 includes a battery powered device or a cordless device. In one embodiment, the fastener device 100 includes a battery powered nailer/nail gun. In another embodiment, the fastener device 100 includes a battery powered stapler gun. In yet another embodiment, the fastener device 100 is configured to drive one or more fasteners 124, including nails, staples, brads, clips or any such suitable fastener, into the workpiece 126.

In one embodiment, a battery 182 of the battery powered fastener device 100 can be configured with a suitable nominal voltage such as 7.2, 12, 36 volts, etc. using a suitable battery chemistry such as nickel cadmium, lithium ion, etc. In one embodiment, the fastener driver 100 can also be configured to be hybrid between being powered by an alternating current (AC) power source (e.g., wall voltage) and a direct current (DC) power source (e.g., the battery).

Figure 1B:
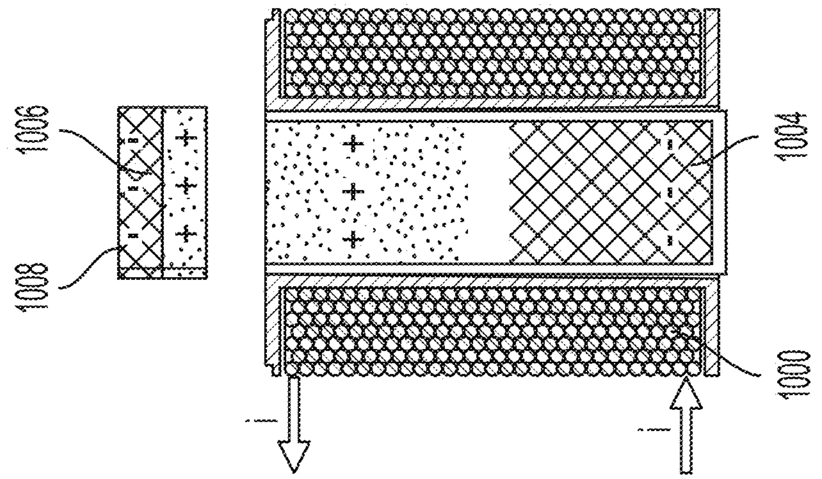
Figure 1C:
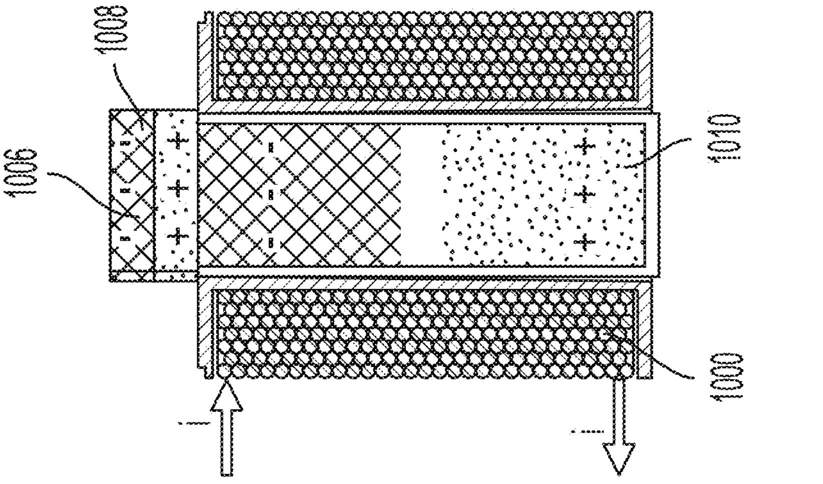
Figure 2:
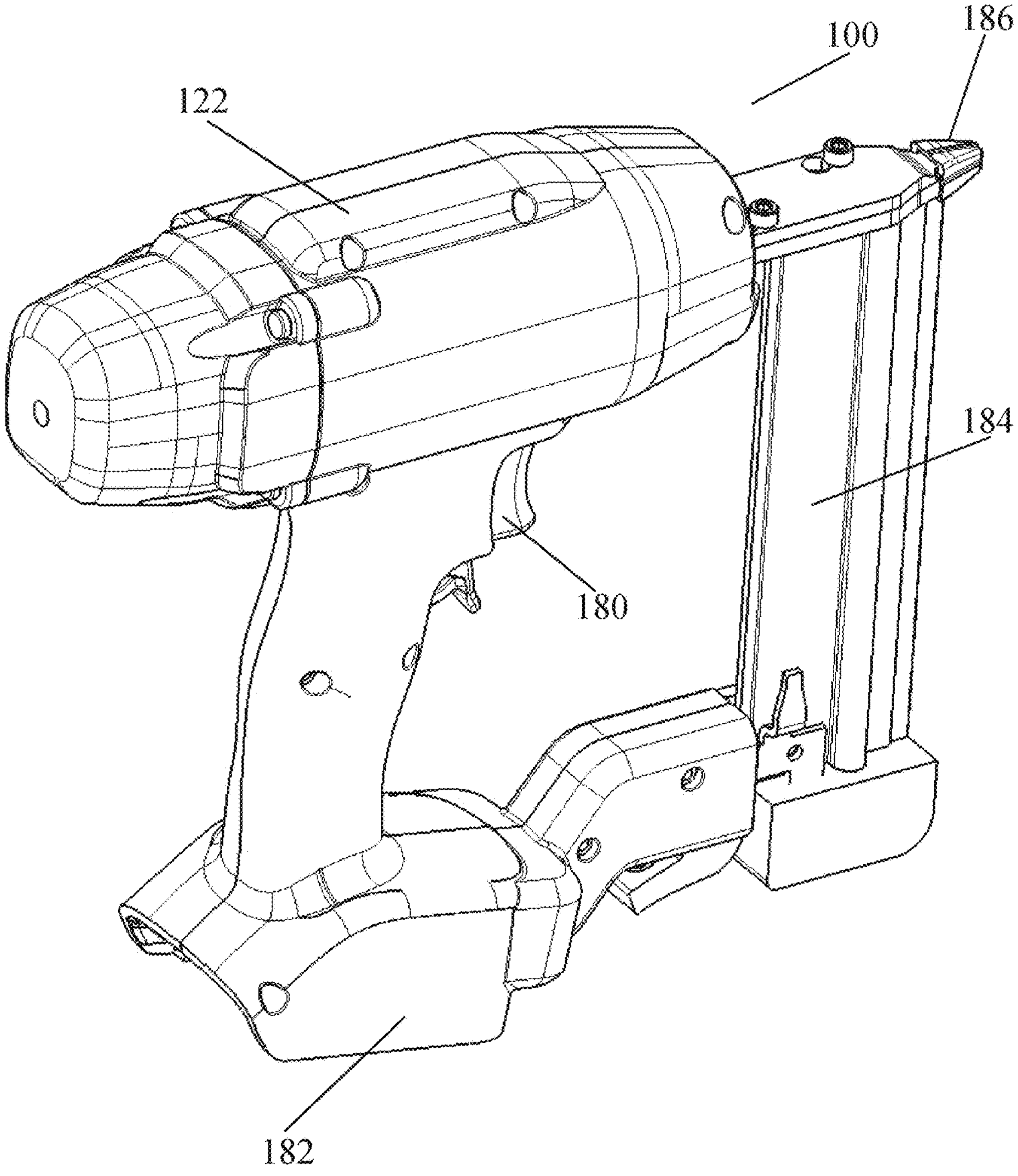
FIG. 2 shows a perspective view of a fastener device according to an embodiment of the present patent application.
Figure 3A:
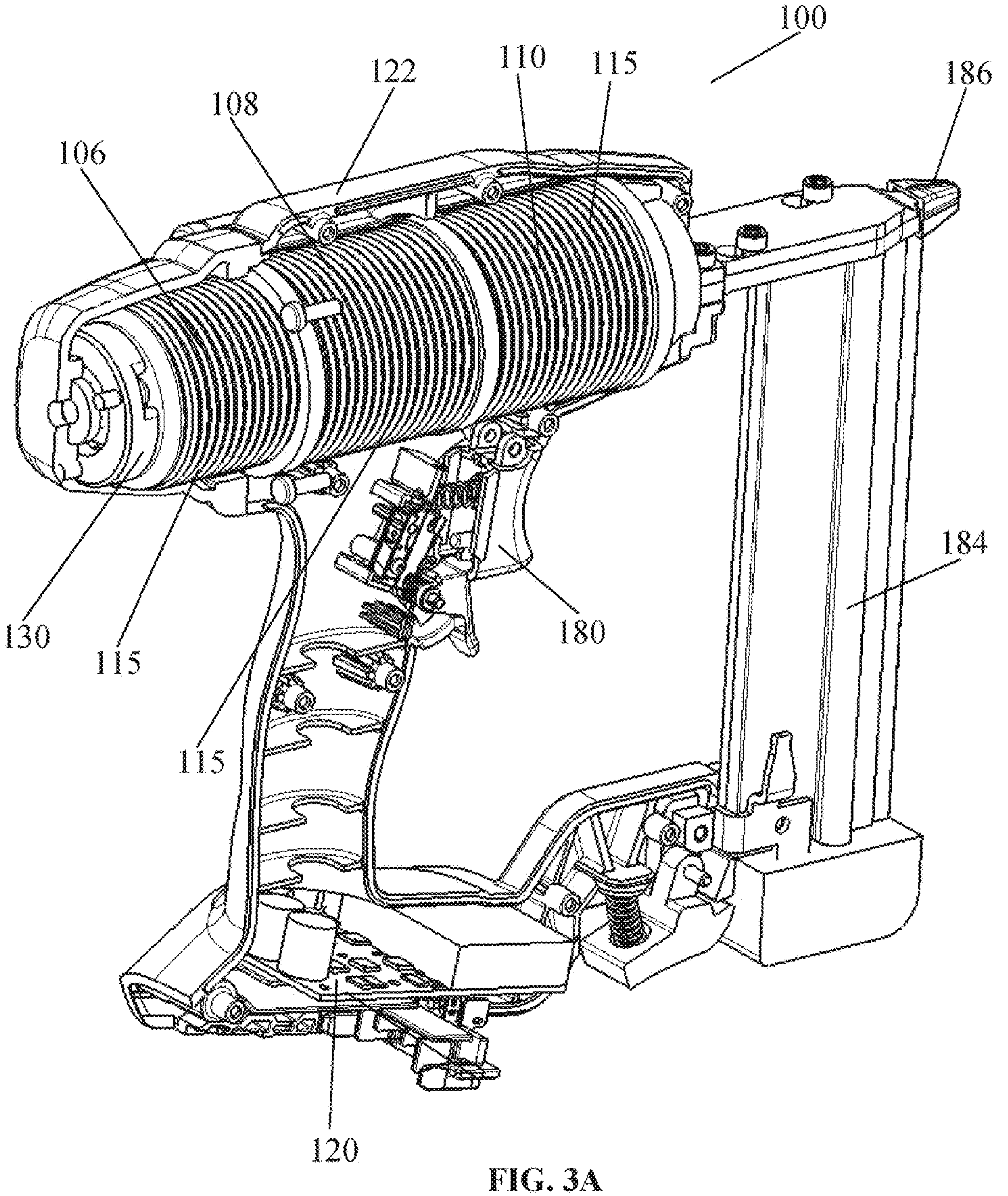
FIG. 3A shows another perspective of the fastener device according to an embodiment of the present patent application, wherein one half of the tool housing is removed for sake of clarity and to better illustrate other features of the fastener device.
Figure 3B:
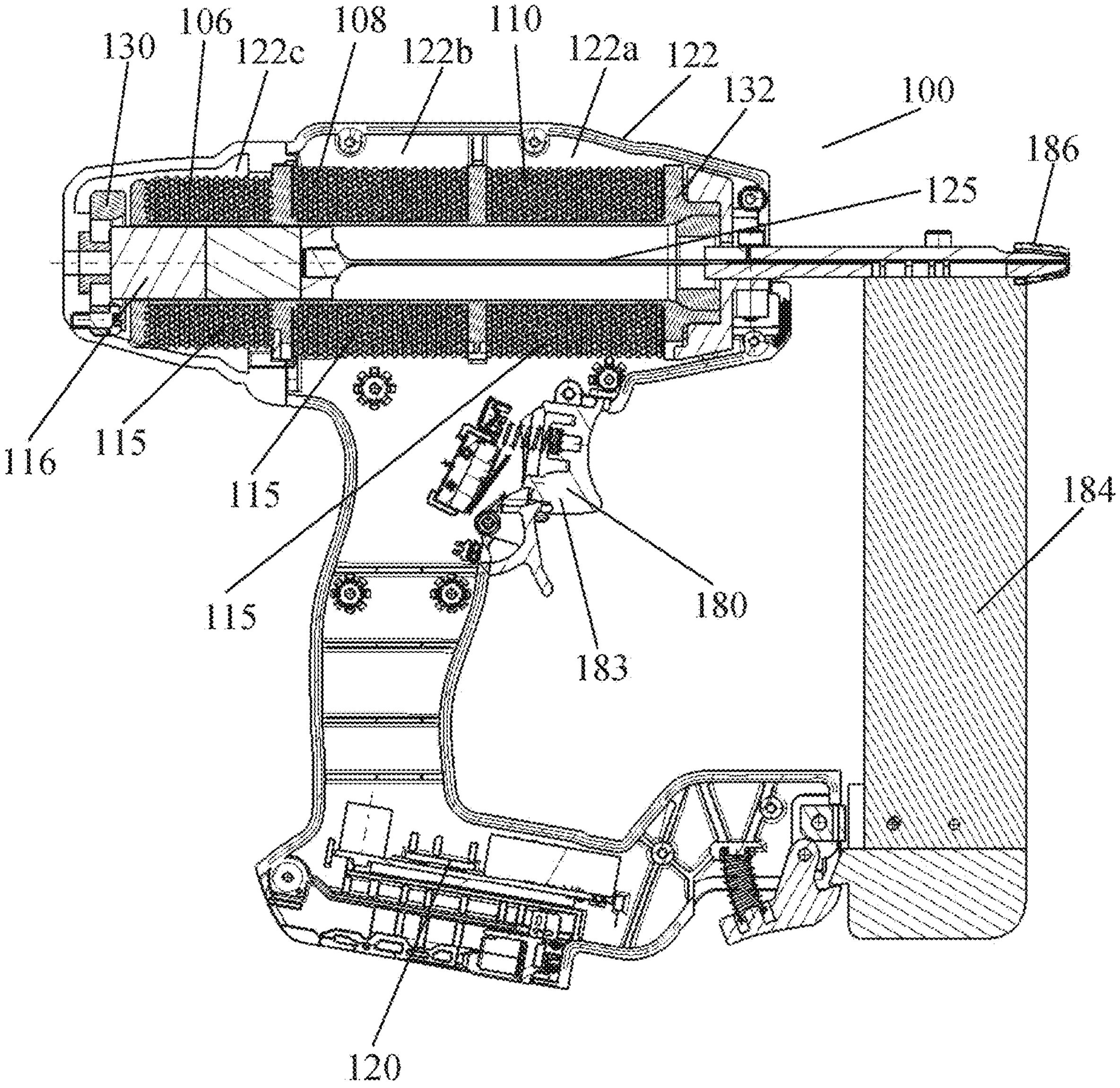
FIG. 3B shows a cross-sectional view of the fastener device according to an embodiment of the present patent application.

FIGS. 1A-1C show an exemplary single stage solenoid system with a magnet to show an interaction between the electromagnetic field of the solenoid and the magnetic field of the magnet. FIGS. 1A-1C show a single stage solenoid for ease of understanding and sake of clarity of the principles of interaction between the electromagnetic field of the solenoid and the magnetic field of the magnet. One embodiment of the present patent application, however, uses a multistage solenoid that has at least two stages.

FIG. 1A shows a solenoid 1000 and its electromagnetic field 1002. The solenoid 1000 generally includes coils/coil assembly 1005. When a current is supplied to the coils 1005 of the solenoid 1000 in a predetermined direction (that is the current is supplied (or going in) at the lower end of the coils 1005 of the solenoid 1000 and the current is coming out at the upper end of the coils 1005 of the solenoid 1000), the solenoid 1000 generates the electromagnetic field 1002 as shown by the magnetic field lines of this figure. That is, when a current is supplied through the coils 1005 of the solenoid 1000, an electromagnetic field 1002 is generated and the electromagnet/solenoid 1000 becomes active.

FIG. 1B shows the solenoid 1000 generating its first electromagnetic field 1004, a magnet 1006 with its own magnetic field 1008 and an interaction between the first electromagnetic field 1004 of the solenoid 1000 and the magnetic field 1008 of the magnet 1006. When a current is supplied to the solenoid 1000 in a predetermined direction (that is the current is supplied (or going in) at the lower end of the coil of the solenoid 1000 and the current is coming out at the upper end of the coil of the solenoid 1000), the solenoid 1000 generates the electromagnetic field 1004 (i.e., with positive charge at the top of the solenoid 1000 and with negative charge at the bottom of the solenoid 1000). The direction in which the current is driven/supplied through the coils determines the polarity of the electromagnet/solenoid 1000. The magnetic field 1008 of the magnet 1006 has a positive charge at the bottom of the magnet 1006 and a negative charge at the bottom of the magnet 1006. Thus, in this configuration of FIG. 1B, as the direction of the electromagnetic field 1004 (i.e., positive charge at the top and negative charge on the bottom) of the solenoid 1000 is opposite to the direction of the magnetic field 1008 (i.e., positive charge at the bottom and negative charge on the top) of the magnet 1006, the magnet 1006 is repelled by the electromagnetic field 1004 of the solenoid 1000.

FIG. 1C shows the solenoid 1000 generating its second electromagnetic field 1010, the magnet 1006 with its own magnetic field 1008 and an interaction between the second electromagnetic field 1010 of the solenoid 1000 and the magnetic field 1008 of the magnet 1006. When a current is supplied to the solenoid 1000 in a direction opposite to the predetermined direction (that is the current is supplied (or going in) at the upper end of the coil of the solenoid 1000 and the current is coming out at the lower end of the coil of the solenoid 1000), the solenoid 1000 generates the electromagnetic field 1010 (i.e., with negative charge at the top of the solenoid 1000 and with positive charge at the bottom of the solenoid 1000). The magnetic field 1008 of the magnet 1006 has a positive charge at the bottom of the magnet 1006 and with negative charge at the bottom of the magnet 1006. Thus, in this configuration of FIG. 1C, as the direction of the electromagnetic field 1004 (i.e., positive charge at the bottom and negative charge on the top) of the solenoid 1000 is same as the direction of the magnetic field 1008 (i.e., positive charge at the bottom and negative charge on the top) of the magnet 1006, the magnet 1006 is attracted by the electromagnetic field 1010 of the solenoid 1000.

The polarity of the electromagnet/solenoid 1000 either repels the magnet 1006 from or will attract the magnet to the air core of the electromagnet/solenoid 1000. These principles of the interaction between the electromagnetic field of the solenoid and the magnetic field of the magnet shown and explained in FIGS. 1A-1C are used in the present patent application.

One embodiment of the present patent application provides the fastener device 100 using the multi-stage solenoid 102 and the magnetic driver 116. The magnetic driver may interchangeably referred to as magnetic plunger. The magnetic plunger 116 is configured to increase the amount of force the coils of the multistage solenoid 102 can impart on the magnetic plunger 116 because the magnetic field of the magnetic plunger 116 and the electromagnetic fields 112, 114 of the multistage solenoid 102 work in tandem. The fastener device 100 also not only de-energizes a stage/a coil assembly 106, 108, 110 of the multistage solenoid 102 to collapse the electromagnetic field 112, 114 after the magnetic driver/plunger 116 is pulled into of that stage of the multistage solenoid 102, but also re-energizes the same stage/coil assembly 106, 108, 110 of the multistage solenoid 102 with a reversed magnetic field (by reversing the direction of current through the coil assembly of the multistage solenoid 102) to further impart force on the magnetic plunger/driver 116 while the magnetic plunger/driver 116 is exiting the stage/coil assembly of the multistage solenoid 102. This effect is impractical with a standard steel solenoid plunger/driver of the prior art. In one embodiment, the fastener device 100 is battery powered. In one embodiment, the fastener device 100 is also configured to allow current reversal of the stages of the multistage solenoid 102 and is also configured to facilitate electronic return of its magnetic plunger 116 as will be discussed in detail below. In one embodiment, the multistage solenoid/electromagnet 102 is affixed within the frame/housing 122 of the fastener tool/device 100. When the fastener tool/device 100 is actuated, current is run through the electromagnetic stages to push and pull the magnetic driver 116 driving magnetic driver 116 toward the nail/fastener 124. The current is reversed across the stages 108 as the magnetic driver 116 passes through the core of the multistage solenoid/electromagnet 102 in order to impart force on the magnetic driver 116.

In one embodiment, the tool housing 122 is an exterior (claim shell) housing, which can house the first stage 106, the second stage 108 and the third stage 110 of the multistage solenoid 102. In one embodiment, the tool housing 122 further contains the magnetic driver 116 and the controller 120. While the multistage solenoid 102 is shown in the illustrated embodiments with the first stage 106, the second stage 108, the third stage 110, the multistage solenoid 102 can include additional (i.e., more than three) stages or can include at least two stages.

Figure 5:
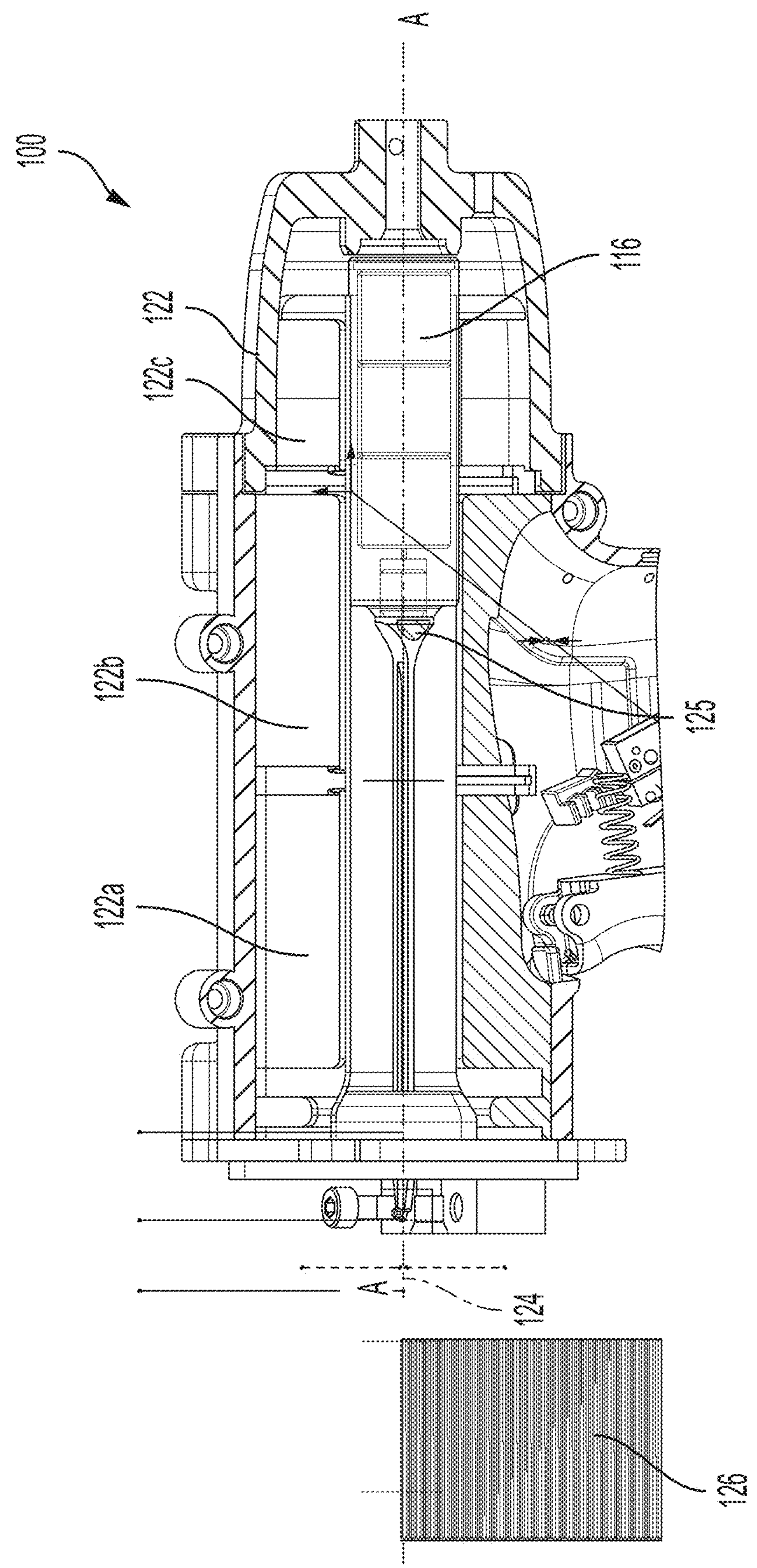
FIG. 5 shows another partial cross-sectional view of the fastener device with the magnetic driver, wherein coil assemblies of the multistage solenoid are shown for sake of clarity and to better illustrate other features of the fastener device, in accordance with an embodiment of the present patent application.

FIG. 5 shows a cross-sectional view of the tool housing 122 without coil assemblies 115 of each stage 106, 108, 110 of the multistage solenoid 102. In one embodiment, as shown in FIG. 5, the tool housing 122 includes three compartments/portions 122*a*, 122*b*, 122*c* that are disposed axially along with a longitudinal axis A-A of the magnetic driver 116. Each of these three compartments/portions 122*a*, 122*b*, 122*c* of the tool housing 122 are configured to receive coil assemblies 115 of each of the stages 106, 108, 110 of the multistage solenoid 102.

In one embodiment, the fastener device 100 also includes a nosepiece 186, a fastener magazine 184, and the battery 182. In one embodiment, the multistage solenoid 102 moves the magnetic driver 116 to the extended condition so that a portion of a driver blade 125 can move into the nosepiece 186. In doing so, the driver blade 125 can drive the fastener 124 from the fastener magazine 184 into the workpiece 126. In this regard, the fastener magazine 184 can sequentially feed one or more of the fasteners 124 into the nosepiece 186.

In one embodiment, the battery 182 is mechanically coupled to the exterior housing 122 and is electrically coupled to the multistage solenoid 102 via the controller 120. In one embodiment, the tool housing 122 also includes a trigger assembly 180 that activates a driver sequence that causes the magnetic driver 116 to travel between at least the two stages 106 and 108, 108 and 110, or 106, 108 and 110. As such, the controller 120 can control the stages 106, 108, 110 of the multistage solenoid 102 to move the magnetic driver 116 so that the driver blade 125 can drive the fastener 124 into the workpiece 126 when the trigger assembly 180 is retracted. In doing so, the trigger assembly 180, by way of retracting a trigger 183, can control the execution of a driver sequence. The driver sequence can include moving the magnetic driver 116 from the retracted condition (FIGS. 3A, 3B, 4) to the extended condition (in FIG. 6A) and back to the retracted condition. In one embodiment, the controller 120 in the tool housing 122 connects the trigger assembly 180 to the multistage solenoid 102. In one embodiment, the tool housing 122 defines a handle portion, and the trigger assembly 180 is connected to the tool housing 122, adjacent the handle portion.

In one embodiment, the multistage solenoid 102 is contained within the tool housing 122. In one embodiment, the multistage solenoid 102 has at least two stages 106, 108, and 110. In one embodiment, the multistage solenoid 102 has two stages. In illustrated embodiment, the multistage solenoid 102 has three stages 106, 108, and 110. In one embodiment, the multistage solenoid 102 is configured drive the magnetic driver 116 between a retracted condition (see, e.g., FIGS. 4 and 5) and an extended condition (see, e.g., in FIG. 6A) by interaction between the electromagnetic fields 112, 114 of the multistage solenoid 102 and the magnetic fields 118 of the magnetic driver 116.

Each stage 106, 108, 110 of the multistage solenoid 102 is configured to be selectively energized to generate a first electromagnetic field 112 and to generate a second electromagnetic field 114. In one embodiment, the second electromagnetic field 114 has a polarity different from the first electromagnetic field 112. In one embodiment, each stage 106, 108, 110 of the multistage solenoid 102 is also configured to be selectively de-energized to collapse its first electromagnetic field 112 and the second electromagnetic field 114.

In one embodiment, the at least two stages of the multistage solenoid 102 includes three stages 106, 108, and 110 that are disposed adjacent to each other and sequentially along an axis parallel to a longitudinal axis A-A of the magnetic driver 116.

In one embodiment, the multistage solenoid 102 may be referred to as a linear electromagnetic motor or a multistage linear electromagnetic motor that is configured to be used in combination with a nailer. In one embodiment, the motor includes multiple coils/coil assemblies 115 in series constrained axially and the magnetic driver 116 circumscribed by the multiple coils/coil assemblies 115.

In one embodiment, each stage 106, 108 and 110 of the multistage solenoid 102 includes one or more coils/coil assemblies 115 that can be selectively energized to establish/generate the electromagnetic field 112 or 114 and de-energized to collapse the electromagnetic fields 112 and 114. In one embodiment, the one or more coils/coil assemblies 115 are made of copper. In one embodiment, by selectively energizing and de-energizing the stages 106, 108 and 110 of the multistage solenoid 102, the electromagnetic fields 112, 114 of the multistage solenoid 102 interact with the magnetic field 118 of the magnetic driver 116 to establish a generally linear motion (e.g., along the longitudinal axis A-A) of the magnetic driver 116 that moves relative to the stages 106, 108 and 110 of the multistage solenoid 102. In one embodiment, the interaction between the electromagnetic fields 112, 114 of the multistage solenoid 102 and the magnetic field 118 of the magnetic driver 116 is configured to efficiently drive the one or more fasteners 124 into the workpiece 126. Thus, the multistage solenoid 102 can save the energy to maintain the electromagnetic fields by collapsing and/or switching/reversing the electromagnetic fields at predetermined times and/or locations of the magnetic driver 116 relative to the stages 106, 108 and 110 of the multistage solenoid 102.

In one embodiment, each stage 106, 108 and 110 of the multistage solenoid 102 includes the same length coil assembly. In one embodiment, the first stage 106 has shorter coil assembly than the coil assemblies of the second stage 108 and the third stage 110. In one embodiment, the coil assemblies of the second stage 108 and the third stage 110 have the same length. In one embodiment, the coil assemblies of the second stage 108 and the third stage 110 have different length.

In one embodiment, the magnetic driver 116 is configured to travel through the multistage solenoid 102 between a retracted condition and an extended condition to drive a fastener 124 of the one or more fasteners 124 into the workpiece 126 during a drive stroke. In one embodiment, the magnetic driver 116 has a magnetic field 118. In one embodiment, the magnetic driver 116 has the longitudinal axis A-A. In one embodiment, the magnetic driver 116 is made from a magnetic material. In one embodiment, the magnetic driver 116 includes a magnetic driver blade and is accelerated by the multiple coils/coil assemblies through their cores/air gaps. In one embodiment, the magnetic driver blade forces the nail/fastener 124 into the work piece 126.

In one embodiment, the magnetic driver 116 can be interchangeably referred to as a plunger member. In one embodiment, the magnetic driver 116 can travel between a top stop 130 and a bottom stop 132. In one embodiment, the top stop 130 and/or the bottom stop 132 can be a portion of the top and bottom stages, respectively, an interior portion of the exterior housing 122, a separate component connected to the interior portion of the exterior housing 112 and/or the stages 106, 110, and/or one or more combinations thereof.

In one embodiment, the magnetic driver 116 is configured to cycle through the driver sequence that can drive the fastener 124 into the workpiece 126. In one embodiment, the driver sequence can begin, for example, with the magnetic driver 116 in the retracted condition (i.e., at or near the top stop 130). The first stage 106 and the second stage 108 can be energized to establish the respective electromagnetic fields 112, 114 to draw the magnetic driver 116 toward the second stage 108 and to an extended condition. The magnetic driver 116 can end its motion at or near the bottom stop 132. In one embodiment, the driver sequence can include moving the magnetic driver 116 from the retracted condition to the extended condition and back to the retracted condition.

In one embodiment, the magnetic driver 116 travels through the air gaps of each of the stages 106, 108, 110 of the multistage solenoid 102 while the magnetic driver 116 travels between the extended condition and the retracted condition.

In one embodiment, the tool housing 122 contains the controller 120. As used herein, the term controller can refer to an application specific integrated circuit (ASIC), an electronic circuit, a processor (shared, dedicated, or group) and memory that executes one or more software or firmware programs, a combinational logic circuit, other suitable components and/or one or more suitable combinations thereof that provide the described functionality.

In one embodiment, the controller 120 is configured to control (e.g., energize and de-energize) the multistage solenoid 102 to move the magnetic driver 116 during the drive stroke and the return stroke.

In one embodiment, the controller 120 is configured to control the first stage 106, the second stage 108, and the third stage 110 to move the magnetic driver 116 so that the magnetic driver 116 can drive one or more fasteners 124 into the workpiece 126 that are sequentially fed from the fastener magazine 184 when a trigger assembly 180 is retracted/actuated. The fasteners 124 can be nails, staples, brads, clips or any such suitable fastener 124 that can be driven into the workpiece 126.

In one embodiment, the controller 120 is contained within the tool housing 122 and is configured to adjust an amount of force the multistage solenoid 102 imparts on the magnetic driver 116 while the magnetic driver 116 travels between a first stage 106/108 and a second stage 108/110 that are adjacent to each other, by combining the magnetic field 118 of the magnetic driver 116 with at least a portion of the first electromagnetic field 112 of the first stage 106/108 of the at least two stages of the multistage solenoid 102 and at least a portion of the second electromagnetic field 114 of the second stage 108/110 of the multistage solenoid 102.

In one embodiment, the first electromagnetic field 112 includes an electromagnetic field generated by a stage of the multistage solenoid 102 when the current is supplied to that stage of the multistage solenoid 102 in a predetermined direction (i.e., the current is supplied (or going in) at the upper end of the coil of that stage of the multistage solenoid 102 and the current is coming out at the lower end of the coil of that stage of the multistage solenoid 102). In one embodiment, the second electromagnetic field 114 includes an electromagnetic field generated by a stage of the multistage solenoid 102 when the current is supplied to the coils of that stage of the multistage solenoid 102 in a direction opposite to the predetermined direction (i.e., the current is supplied (or going in) at the lower end of the coil of the multistage solenoid 102 and the current is coming out at the upper end of the coil of the multistage solenoid 102).

In another embodiment, the first electromagnetic field 112 includes an electromagnetic field generated by a stage of the multistage solenoid 102 when the current is supplied to that stage of the multistage solenoid 102 in a predetermined direction (i.e., the current is supplied (or going in) at the lower end of the coil of the multistage solenoid 102 and the current is coming out at the upper end of the coil of the multistage solenoid 102). In another embodiment, the second electromagnetic field 114 includes an electromagnetic field generated by a stage of the multistage solenoid 102 when the current is supplied to the coils of that stage of the multistage solenoid 102 in a direction opposite to the predetermined direction (i.e., the current is supplied (or going in) at the upper end of the coil of the multistage solenoid 102 and the current is coming out at the lower end of the coil of the multistage solenoid 102).

In one embodiment, one of the three stages 106, 108, 110 of the multistage solenoid 102 is de-energized to collapse its first electromagnetic field and its second electromagnetic field. In one embodiment, the remaining two stages 106 and 108 or 108 and 110 of the three stages of the multistage solenoid 102 that are immediately adjacent to each other are energized to generate the first electromagnetic field 112 and the second electromagnetic field 114, respectively to facilitate the movement of the magnetic driver 116 between the remaining two stages 106 and 108 or 108 and 110. With this configuration of the multistage solenoid 102 in which one of the three stages 106, 108, 110 of the multistage solenoid 102 is de-energized to collapse its first electromagnetic field and its second electromagnetic field, the energy consumed by the fastener device 100 can be minimized (i.e., can result in a relative increase in battery life of the fastener device 100).

Figures 6A, 6B, 6C:
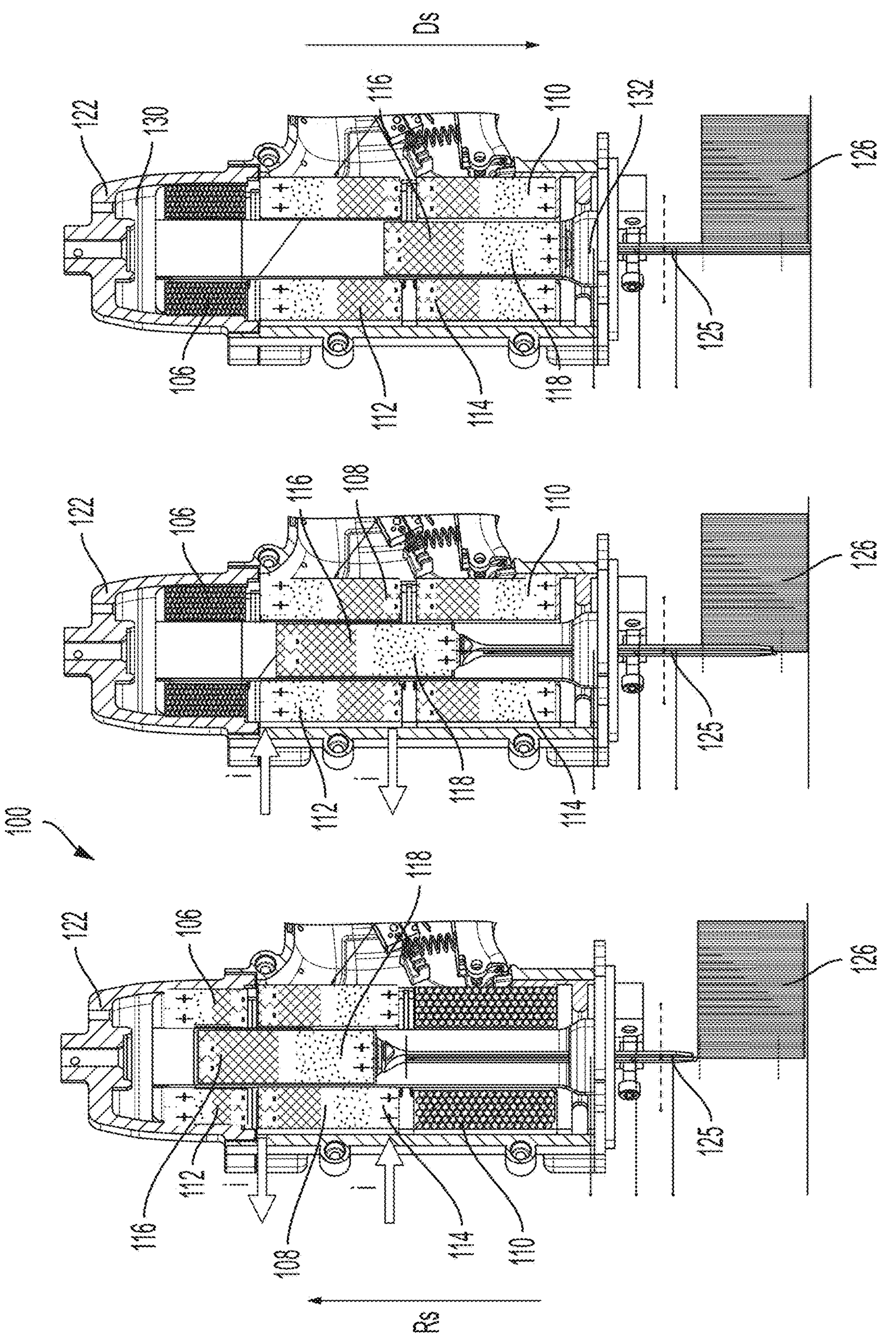
FIGS. 6A, 6B, and 6C show partial cross-sectional views of the fastener device showing the interaction between electromagnetic fields of the multistage solenoid and magnetic field of the magnetic driver during a drive stroke in accordance with an embodiment of the present patent application.
Figures 7A, 7B, 7C, 7D:
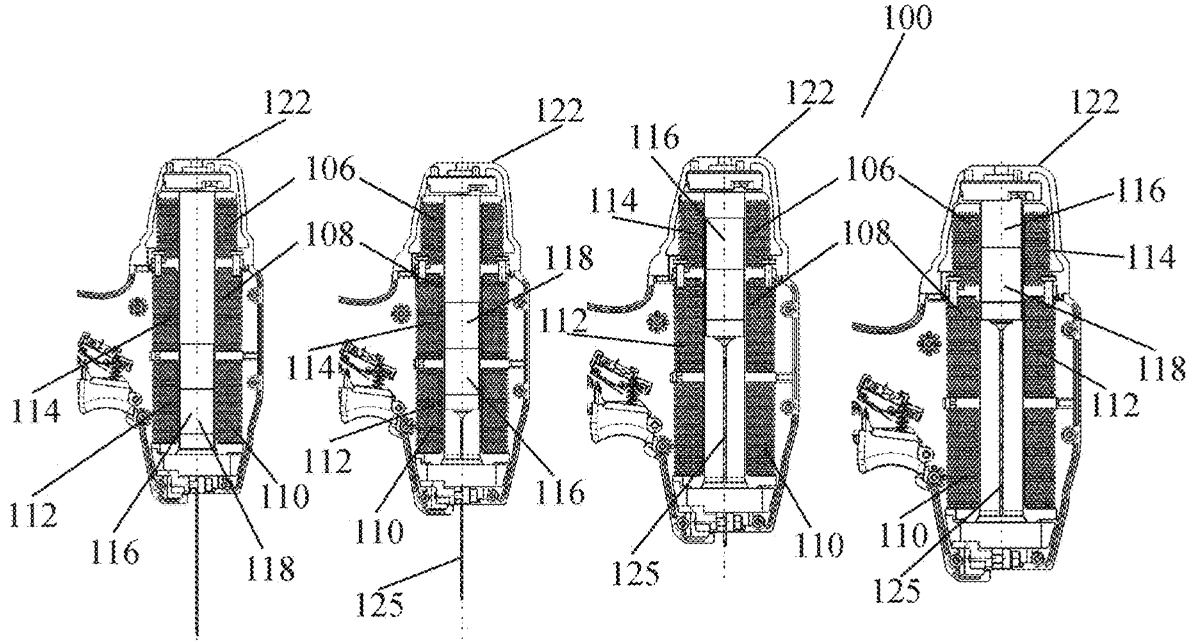
FIGS. 7A, 7B, 7C, and 7D show partial cross-sectional views of the fastener device showing the interaction between electromagnetic fields of the multistage solenoid and magnetic field of the magnetic driver during a return stroke in accordance with an embodiment of the present patent application.

For example, as illustrated in FIGS. 6A, 6B, 6C, the third stage 110 of the multistage solenoid 102 is de-energized to collapse its first electromagnetic field 112 and its second electromagnetic field 114, while the remaining two stages 106 and 108 of the three stages of the multistage solenoid 102 that are immediately adjacent to each other are energized to generate the first electromagnetic field 112 and the second electromagnetic field 114, respectively to facilitate the movement of the magnetic driver 116 between the remaining two stages 106 and 108. Also, as shown in FIGS. 6A, 6B, 6C, the first stage 106 of the multistage solenoid 102 is de-energized to collapse its first electromagnetic field 112 and its second electromagnetic field 114, while the remaining two stages 108 and 110 of the three stages of the multistage solenoid 102 that are immediately adjacent to each other are energized to generate the first electromagnetic field 112 and the second electromagnetic field 114, respectively to facilitate the movement of the magnetic driver 116 between the remaining two stages 108 and 110.

In one embodiment, the second stage 108 of the three stages of the multistage solenoid 102 is energized to generate its second electromagnetic field 114 to facilitate the movement of the magnetic driver 116 between the first stage 106 and the second stage 108 of the multistage solenoid 102. In one embodiment, the same second stage 108 of the three stages of the multistage solenoid 102 is energized and switched from its second electromagnetic field 114 to (i.e., be in and generate) its first electromagnetic field 112 to facilitate the movement of the magnetic driver 116 between the second stage 108 and the third stage 110 of the multistage solenoid 102.

In one embodiment, the first stage 106 of the three stages 106, 108 and 110 of the multistage solenoid 102 is energized to generate its first electromagnetic field 112, the second stage 108 of the three stages 106, 108 and 110 of the multistage solenoid 102 is energized to generate its second electromagnetic field 114, and the third stage 110 of the three stages 106, 108 and 110 of the multistage solenoid 102 is de-energized to collapse its first electromagnetic field 112 and its second electromagnetic field 114 to facilitate the movement of the magnetic driver 116 between the first stage 106 and the second stage 108 of the multistage solenoid 102.

In one embodiment, the first stage 106 of the three stages 106, 108 and 110 of the multistage solenoid 102 is de-energized to collapse its first electromagnetic field 112 and its second electromagnetic field 114, the second stage 108 of the three stages 106, 108 and 110 of the multistage solenoid 102 is energized and switched from its second electromagnetic field 114 to (i.e., be in and to generate) its first electromagnetic field 112, and the third stage 110 of the three stages 106, 108 and 110 of the multistage solenoid 102 is energized to generate its second electromagnetic field 114 to facilitate the movement of the magnetic driver 116 between the second stage 108 and the third stage 110 of the multistage solenoid 102.

In one embodiment, as shown in FIGS. 7A, 7B, 7C, and 7D, the electromagnetic fields 112, 114 generated by the stages 106, 108 and 110 of the multistage solenoid 102 can be controlled to move the magnetic driver 116 in a return stroke direction $R_s$, which is opposite to the driver stroke direction $D_s$, to return the magnetic driver 116 to the retracted or beginning condition (i.e., at or near the top stop 130).

To return the magnetic driver 116 to the retracted condition, the first stage 106, the second stage 108 and/or the third stage 110 can be sequentially energized or de-energized but the direction of their electromagnetic fields 112, 114 can be reversed so as to reverse the direction of the electromagnetic force interacting with the magnetic field 118 of the magnetic driver 116.

In one embodiment, during the return stroke, the first stage 106 of the three stages 106, 108, 110 of the multistage solenoid 102 is maintained de-energized to collapse its first electromagnetic field 112 and its second electromagnetic field 114, the second stage 108 of the three stages 106, 108, 110 of the multistage solenoid 102 is energized and switched from its first electromagnetic field 112 to its second electromagnetic field 114, and the third stage 110 of the three stages 106, 108, 110 of the multistage solenoid 102 is energized and switched from its second electromagnetic field 114 to its first electromagnetic field 112 to facilitate the movement of the magnetic driver between the second stage and the third stage in the return stroke direction Rs.

In one embodiment, during the return stroke, the first stage 106 of the three stages 106, 108, 110 of the multistage solenoid 102 is energized to generate its second electromagnetic field 114, the second stage 108 of the three stages 106, 108, 110 of the multistage solenoid 102 is energized and switched from its second electromagnetic field 114 to its first electromagnetic field 112, and the third stage 110 of the three stages 106, 108, 110 of the multistage solenoid 102 is de-energized to collapse its first electromagnetic field 112 to facilitate the movement of the magnetic driver between the first stage 1106 and the second stage 108 in the return stroke direction Rs.

Figure 4:
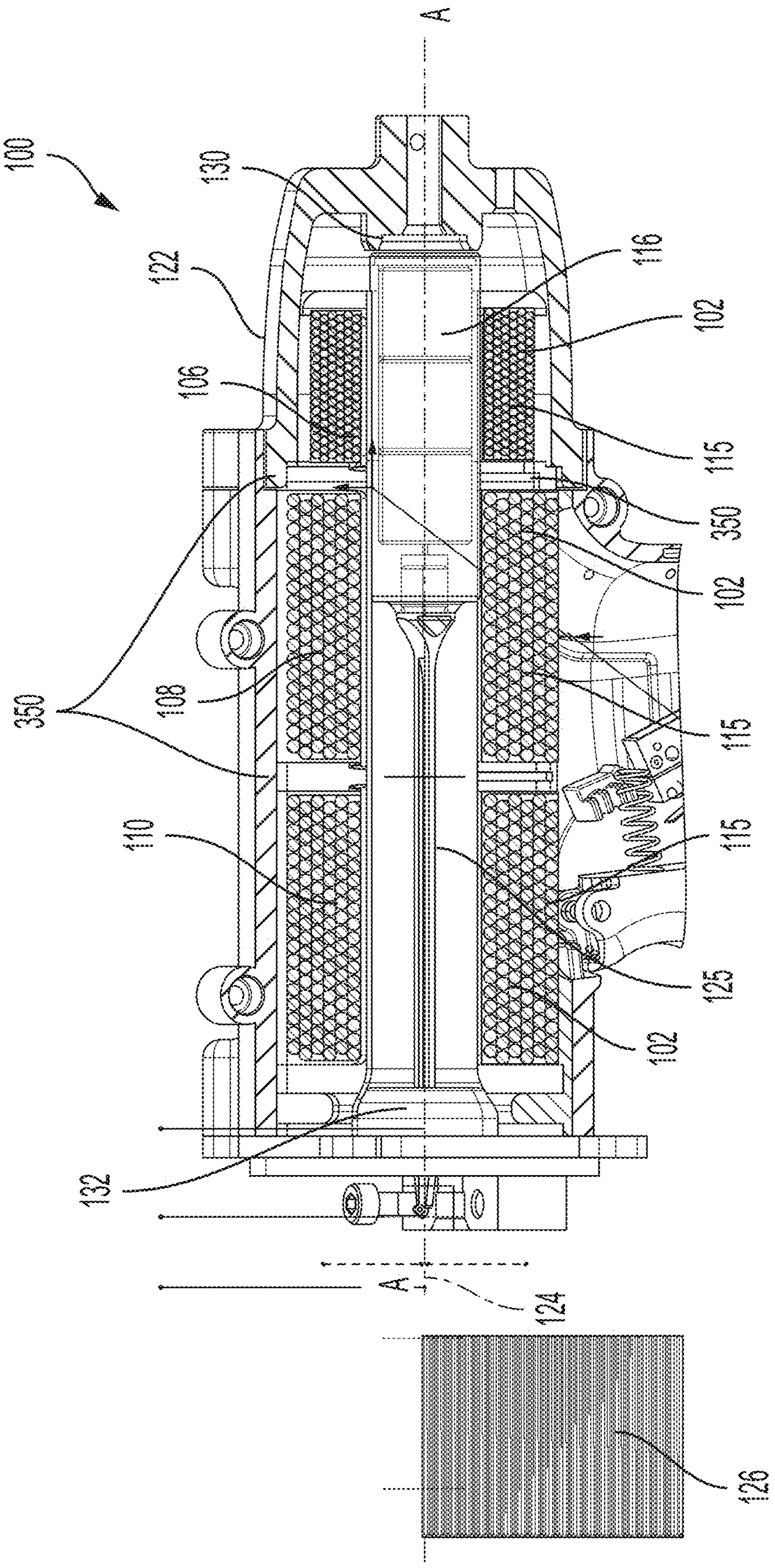
FIG. 4 shows a partial cross-sectional view of the fastener device with multistage solenoid and a magnetic driver in accordance with an embodiment of the present patent application.
Figure 8:
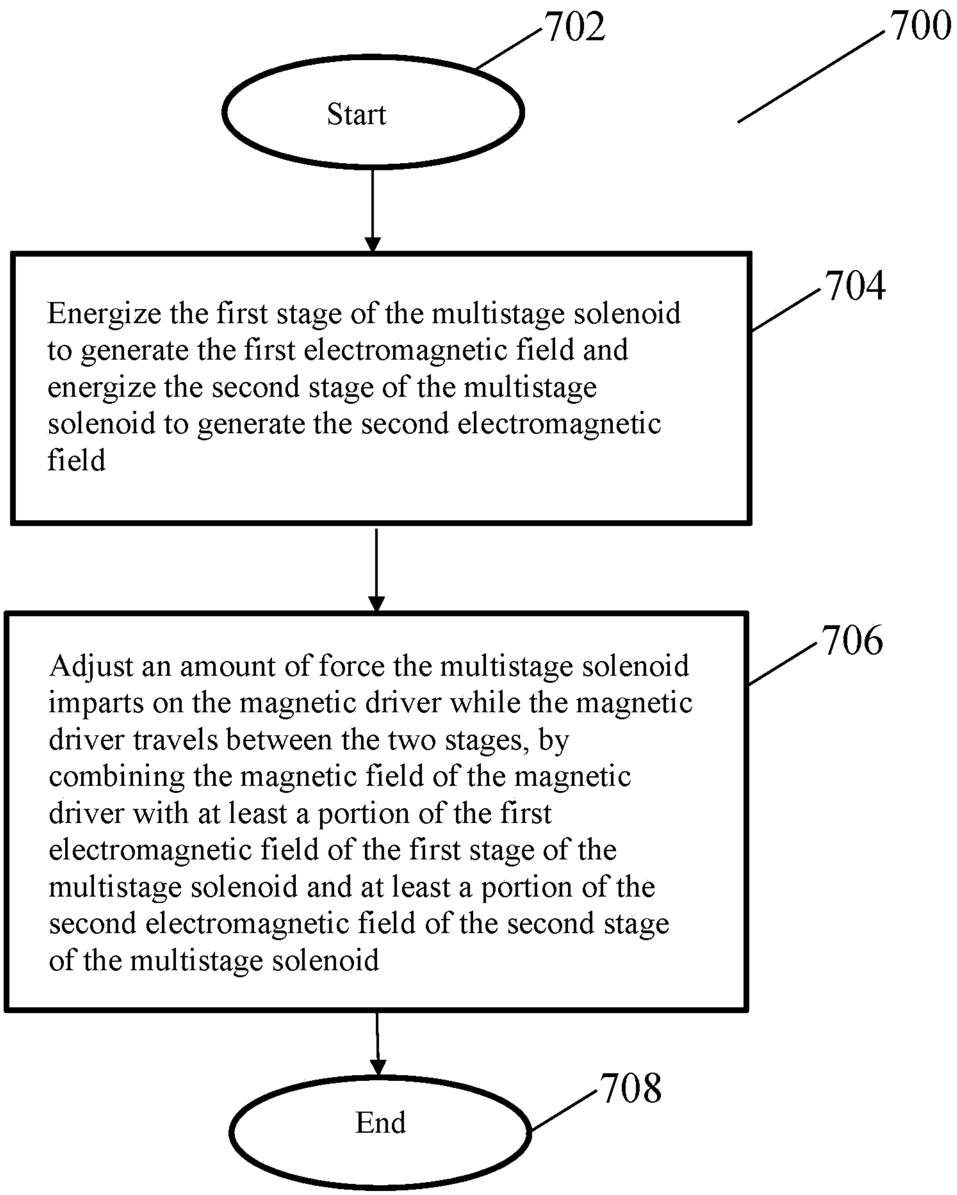
FIG. 8 shows a flowchart of an exemplary method of use of the multistage (two stages) solenoid and the magnetic driver in the fastener device in accordance with an embodiment of the present patent application.
Figure 9:
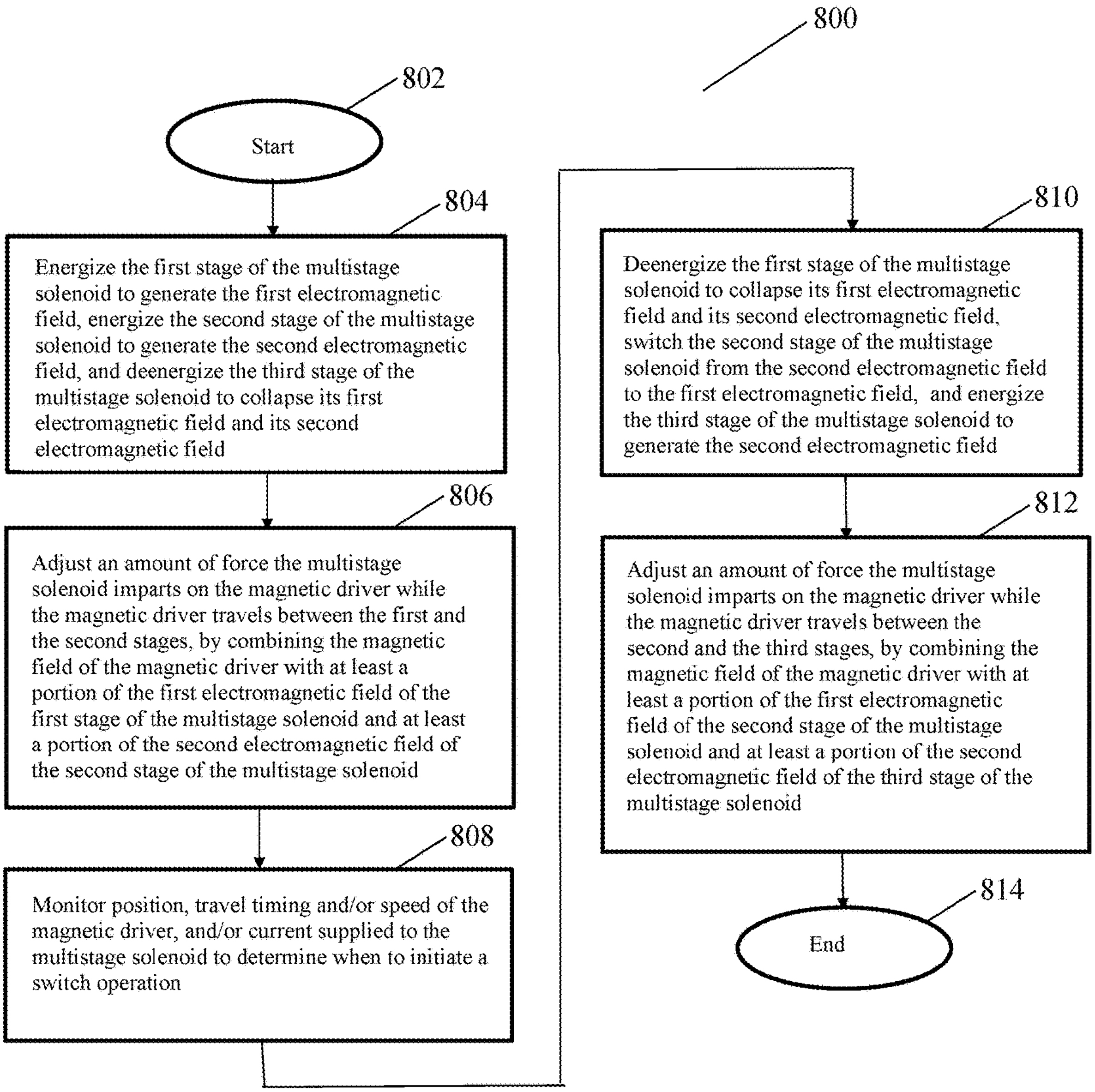
FIG. 9 shows another flowchart of another exemplary method of use of the multistage (three stages) solenoid in the fastener device in accordance with an embodiment of the present patent application.

In one embodiment and with reference to FIGS. 8 and 9, exemplary methods 700 and 800 are illustrated in flow charts that can be used with the multistage solenoid 102 and the magnetic driver 116 and, for example, the fastener device/tool 100 having the multistage solenoid 102 that moves the magnetic driver 116, as shown in FIGS. 4 and 6.

At procedure 702 of the method 700, a user of the fastener device/tool 100 can retract/actuate the trigger assembly 180. Upon detecting the actuation of the trigger assembly 180, the controller 120 can direct power to the first stage 106 and can direct power to the second stage 108. At the procedure 704 of the method 700, the first stage 106 is energized to generate the first electromagnetic magnetic field 112. Also, at the procedure 704 of the method 700, the second stage 108 is energized to generate the second electromagnetic magnetic field 114. That is, the controller 120, at the procedure 704 of the method 700, is configured to supply the current in one direction into the coil assembly 115 of the first stage 106 and is configured to supply the current in the opposite direction into the coil assembly 115 of the second stage 108 such that the second electromagnetic field 114 of the second stage 108 has a polarity different from the first electromagnetic field 112 of the first stage 106.

At procedure 706 of the method 700, the controller 120 is configured to adjust an amount of force the multistage solenoid 102 imparts on the magnetic driver 116 while the magnetic driver 116 travels between the two adjacent stages 106, 108, by combining the magnetic field 118 of the magnetic driver 116 with at least a portion of the first electromagnetic field 112 of the first stage 106 of the multistage solenoid 102 and at least a portion of the second electromagnetic field 114 of the immediately adjacent stage 108 of the multistage solenoid 102.

For example, while the magnetic driver 116 travels between the two adjacent stages 106, 108, the magnetic field 118 of the magnetic driver 116 interacts with at least a portion of the first electromagnetic field 112 of the first stage 106 of the multistage solenoid 102 such that the first electromagnetic field 112 of the first stage 106 of the multistage solenoid 102 pushes the magnetic driver 116 out of the first stage 106. At the same time, the magnetic field 118 of the magnetic driver 116 also interacts with at least a portion of the second electromagnetic field 114 of the second stage 108 of the multistage solenoid 102 such that the second electromagnetic field 114 of the second stage 108 of the multistage solenoid 102 pulls the magnetic driver 116 into the second stage 108. This pushing and pulling of the magnetic driver 116, while the magnetic driver 116 travels between the two adjacent stages 106, is achievable because of the interaction of the magnetic field 118 of the magnetic driver 116 with the first electromagnetic field 112 of the first stage 106 by pushing action and the interaction of the magnetic field 118 of the magnetic driver 116 with the second electromagnetic field 114 of the first stage 108 (i.e., a polarity different from the first electromagnetic field 112 of the second stage 108) by pulling action.

By using the pushing and pulling actions of the first stage 106 and the second stage 108, respectively, on the magnetic driver 116, while the magnetic driver 116 travels between the two adjacent stages 106, 108, the energy consumed by the fastener device 100 can be minimized (i.e., can result in a relative increase in battery life of the fastener device 100) while the force imparted on the magnetic driver 116 by the multistage solenoid 102 can be maximized.

In one embodiment, while the magnetic driver 116 is traveling through the last portion (e.g., the last one half, the last one third or the last one fourth section) of the first stage 106, the magnetic driver 116 is subject to both the increased pushing by the first electromagnetic field 112 of the first stage 106 of the multistage solenoid 102 and also pulling by the second electromagnetic field 114 of the second stage 108 of the multistage solenoid 102.

To this end, the magnetic driver 116 can be continuously accelerated toward the second stage 108 of the multistage solenoid 102 until the travel of the magnetic driver 116 terminates in the extended condition and/or a portion of the magnetic driver 116 is contacts the second stop 132 that resides on an opposite side of the multistage solenoid 102 from the first stop 130. The controller 120, at procedure 708 of the method 700, removes power from all of the stages, so that each stage does not apply a force to the magnetic driver 116.

The method 700 describes the procedures 702-708 for the multistage solenoid 102 with two stages 106 and 108 and the magnetic plunger 116, while the method 800 describes procedures 802-814 for the multistage solenoid 102 with three stages 106, 108, 110 and the magnetic driver 116. The procedures 802, 804, and 806 of the method 800 are same as the procedures 702, 704, and 706 of the method 700 and, therefore, the procedures 802, 804, and 806 of the method 800 will not be described in detail here.

In one embodiment, at procedure 808 of the method 800, the controller 120 is configured to monitor the current supplied to each stage of the multistage solenoid 102 over time during the drive stroke and during the return stroke and generate monitored data. In one embodiment, the controller 120 is configured to monitor the position of the magnetic driver 116, travel timing of the magnetic driver 116 and/or speed of the magnetic driver 116 over time during the drive stroke and during the return stroke and generate monitored data. In one embodiment, the controller 120 is configured to determine when to initiate a switch operation of each stage of the multistage solenoid 102 based on the monitored data.

In one embodiment, the fastener device 10 includes a sensor disposed between the first stage 106 and the second stage 108 of the multistage solenoid 102 and a sensor disposed between the second stage 108 and the third stage 110 of the multistage solenoid 102. In one embodiment, the sensors are configured to sense the position of the magnetic driver 116 as it moves through the stages of the multistage solenoid 102. In one embodiment, each sensor is configured to generate a signal that can be indicative of the position of the magnetic driver 116 relative to one or more stages of the multistage solenoid 102. In one embodiment, the signal is received by the controller 120. In one embodiment, the signal from the sensor can, for example, indicate changes in current through the sensor. In one embodiment, each sensor includes a sense coil. In one embodiment, the sense coil includes one or more copper windings disposed between the coil assemblies of the first stage 106 and the coil assemblies of the second stage 108 (or between coil assemblies of the second stage 108 and the coil assemblies of the third stage 110). The change in current can be caused by a change in inductance of one or more coil circuits in one or more coil assemblies that can be associated with one or more of the stages. This change in inductance affects the resistance of the one or more coil circuits in the one or more coil assemblies, which can ultimately be measured as a change in current associated with a respective coil circuit. In one embodiment, changes in current is due to movement of the magnetic driver 116 relative to the electromagnetic fields 112, 114 generated by the coil assemblies of the first stage 106 and the coil assemblies of the second stage 108, when the first stage 106 and the second stage 108 are energized.

In one embodiment, as shown in FIG. 4, one or more sensors 350 can be used to detect the position of the magnetic driver 116 relative to the stages 106, 108, 110 in the multistage solenoid 102. In doing so, the position and/or velocity of the magnetic driver 116 and the energizing and collapsing of electromagnetic fields of the stages 106, 108, 110 can be tuned (i.e., adjusted) to further conserve energy and/or increase a force produced by the multistage solenoid 102.

In one embodiment, the sensors could be any form of sensors from mechanical sensors to magnetic sensors to optical sensors. In one embodiment, the solenoid coils themselves can be used as the sensors as the magnetic driver traveling through them would generate a signal that could be read by the controller 120. In one embodiment, the sensors are optional and the electromagnetic fields are solely biased off of timing.

In one embodiment, a switch operation may include changing the stage of the multistage solenoid 102 from an energized to a de-energized state. In one embodiment, the controller 120 determines (e.g., from the monitored data) that the magnetic driver 116 is about to exit the first stage 106. Based on this determination, the controller 120 then de-energizes the first stage 106 and energizes the third stage 110 so as to enable the travel of the magnetic driver 116 between the second stage 108 and the third stage 110. That is, in one embodiment, the controller 120 is configured can shift power from the first stage 106 to the third stage 110 based on the monitored data. In one embodiment, the controller 120 is configured to energize the third stage 110 to generate the second electromagnetic field 114 when the second stage 108 generates the first electromagnetic field 112 so as to enable the travel of the magnetic driver 116 between the second stage 108 and the third stage 110. Thus, in one embodiment, the two or more stages 106, 108, 110 of the multistage solenoid 102 can be energized in a cascading fashion. In one embodiment, by de-energizing one of the three stages 106, 108, 110 of the multistage solenoid 102 at any given time, the energy consumed by the fastener device 100 can be minimized.

In another embodiment, a switch operation may include a change the stage between the first electromagnetic field 112 and the second electromagnetic field 114. In one embodiment, the controller 120 determines (e.g., from the monitored data) that the magnetic driver 116 is about to exit the first stage 106. Based on this determination, the controller 120 switches the first electromagnetic field 112 of the second stage 108 to the second electromagnetic field 114 to enable the travel of the magnetic driver 116 between the second stage 108 and the third stage 110.

In yet another embodiment, the controller 120 is configured to change one stage between the first electromagnetic field 112 and the second electromagnetic field 114 and to change another stage of the multistage solenoid 102 between the energized and the de-energized state at the same time.

In one embodiment, at procedure 810 of the method 800, the controller 120 is configured to perform the switch operation based on the determination performed (i.e., based on the monitored data) at the procedure 808. For example, at the procedure 810 of the method 800, the controller 120 is configured to de-energize the first stage 106 of the multistage solenoid 102 to collapse its first electromagnetic field 112 and its second electromagnetic field 114, switch the second stage 106 of the multistage solenoid 102 from the second electromagnetic field 114 to the first electromagnetic field 112, and energize the third stage 110 of the multistage solenoid 102 to generate the second electromagnetic field 114.

For example, in one embodiment, while the magnetic driver 116 is travelling through the second stage 108 (e.g., after passing the first stage 106), the controller 120 changes the first stage 106 of the multistage solenoid 102 from an energized to a de-energized state, changes the third stage 110 of the multistage solenoid 102 from a de-energized to an energized state (and to generate the second electromagnetic field 114), and also changes the second stage 108 from its second electromagnetic field 114 to its first electromagnetic field 112 so that the first electromagnetic field 112 of the second stage 108 interacts with the magnetic field 118 of the magnet driver 116 to push the magnetic driver 116 out of the second stage 108 and into the third stage 110. At the same time, the second electromagnetic field 114 of the third stage 110 of the multistage solenoid 102 interacts with the magnetic field 118 of the magnet driver 116 to pull the magnetic driver 116 into the third stage 110.

In one embodiment, the controller 120 is configured to control the movement of the magnetic driver 116 through the at least two stages 106 and 108 or 108 and 110 of the multistage solenoid 102 by coordinating the magnetic field 118 of the magnetic driver 116 with the first electromagnetic field 112 of one 106 or 108 of the at least two stages of the multistage solenoid 102 and with the second electromagnetic field 114 of the immediately adjacent stage 108 or 110 of the multistage solenoid 102. In one embodiment, this coordination is based on the monitored data. In one embodiment, the controller 120 is configured to control travel timing of the magnetic driver 116 so as to coordinate the magnetic field 118 of the magnetic driver 116 with the first electromagnetic field 112 of the first stage 106 of the at least two stages of the multistage solenoid 102 and with the second electromagnetic field 114 of the second stage 114 of the at least two stages of the multistage solenoid 102.

Also, procedure 812 of the method 800 is same as the procedure 706 of the method 700 except applying it during the travel of the magnetic plunger 116 between the second stage 108 and the third stage 110 and, therefore, the procedure 812 of the method 800 will not be described in detail here.

In one embodiment, the magnetic plunger 116 can be continuously accelerated toward the third stage 108 of the multistage solenoid 102 until the travel of the magnetic plunger 116 terminates in the extended condition and/or a portion of the magnetic plunger 116 is contacts the second stop 132 that resides on an opposite side of the multistage solenoid 102 from the first stop 130. The controller 120, at procedure 814 of the method 800, removes power from all of the stages, so that each stage does not apply a force to the magnetic driver 116.

In one embodiment, the multistage solenoid 102 can include more than three stages. As the magnetic plunger 116 is drawn from a retracted condition to an extended condition, the stages of the multistage solenoid 102 can be energized to generate a first electromagnetic field, energized to generate a second electromagnetic field, and de-energized in a cascading fashion. To this end, the magnetic plunger 116 can be continuously accelerated toward the next stage until the travel of the magnetic plunger 116 terminates in the extended condition and/or a portion of the magnetic plunger 116 is contacts the second stop 132 that resides on an opposite side of the multistage solenoid 102 from the first stop 130. From the extended condition, each of the stages can be energized to generate a first electromagnetic field, energized to generate a second electromagnetic field, and de-energized in a similar but reverse cascading fashion to draw the magnetic plunger 116 from the extended condition back to the retracted condition.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A fastener device that drives a fastener into a workpiece comprising:

a tool housing;

a multistage solenoid located within the tool housing and including a plurality of stages including a first stage, a second stage, and a third stage disposed sequentially along a longitudinal axis, wherein at a given time, each stage of the plurality of stages is selectively energized to generate an electromagnetic field selected from a group including a first electromagnetic field having a first electromagnetic polarity and a second electromagnetic field having a second electromagnetic polarity, or is selectively de-energized to collapse the electromagnetic field;

a magnetic driver configured to travel through the multistage solenoid between a retracted condition and an extended condition along the longitudinal axis to drive the fastener into the workpiece, wherein the magnetic driver includes a magnetic portion having at least one permanent magnet; and a controller positioned in the tool housing, the controller configured to control energization and de-energization of each stage based on a position of the magnetic driver such that:

wherein, in a first axial position of the magnetic driver, the first stage is energized to generate its first electromagnetic field, the second stage is energized to generate its second electromagnetic field, and a third stage is de-energized, to facilitate movement of the magnetic driver between the first stage and the second stage; and wherein, in a second axial position of the magnetic driver, the first stage is de-energized, the second stage is energized to generate its first electromagnetic field, and the third stage is energized to generate its second electromagnetic field, to facilitate movement of the magnetic driver between the second stage and the third stage.

2. The fastener device of claim 1, wherein the magnetic driver has a longitudinal axis, wherein, as the magnetic polarity of the second stage is changed from the second electromagnetic field to the first electromagnetic field, the controller is configured to deenergize the first stage.

3. The fastener device of claim 2, wherein, as the magnetic polarity of the second stage is changed from the second electromagnetic field to the first electromagnetic field, the controller is configured to initialize energization of the third stage in the second electromagnetic field.

4. The fastener device of claim 1, wherein a total axial length of the magnetic portion is greater than a length of each stage but smaller than a cumulative length of the plurality of stages.

5. The fastener device of claim 1, wherein the controller is configured to control movement of the magnetic driver through the plurality of stages by coordinating the magnetic field of the magnetic driver with the electromagnetic field of the plurality of stages.

6. The fastener device of claim 5, wherein the controller is configured to control travel timing of the magnetic driver so as to coordinate the magnetic field of the magnetic driver with the electromagnetic field of the plurality of stages.

7. The fastener device of claim 1, wherein the tool housing includes a trigger assembly that activates a driver sequence that causes the magnetic driver to travel between the plurality of stages of the multistage solenoid, and wherein the controller in the tool housing is configured to connect the trigger assembly to the multistage solenoid.

8. The fastener device of claim 1, wherein the tool housing defines a handle portion, and wherein the trigger assembly is connected to the tool housing, adjacent the handle portion.

9. The fastener device of claim 1, wherein the multistage solenoid is a linear electromagnetic motor.

10. The fastener device of claim 9, wherein the multistage solenoid is a multistage linear electromagnetic motor.

11. The fastener device of claim 9, wherein the motor includes a plurality of coils corresponding to the plurality of stages and arranged in sequence, wherein each of the plurality of coils is wound around a longitudinal axis formed by the magnetic driver.

12. The fastener device of claim 11, further comprising a sensor fixed to the multistage solenoid and configured to output a signal associated with a position of the magnetic driver, wherein the controller is configured to detect the position of the magnetic driver based on the signal from the sensor, and to change the magnetic polarity of at least one stage from the second electromagnetic field to the first electromagnetic field based on the position of the magnetic driver relative, wherein the sensor is disposed between a first coil of the plurality of coils and a second coil of the plurality of coils.

13. The fastener device of claim 11, wherein a first coil of the plurality of coils and a second coil of the plurality of coils form a larger outer diameter than a third coil of the plurality of coils.

14. The fastener device of claim 1, wherein the magnetic driver is configured to travel through the multistage solenoid from the retracted condition to the extended condition during the drive stroke, and wherein the magnetic driver is configured to travel through the multistage solenoid from the extended condition to the retracted condition during a return stroke.

15. The fastener device of claim 14, wherein the controller is configured to allow for current reversal of each stage of the multistage solenoid so as to facilitate electronic return of the magnetic driver during the return stroke.

16. The fastener device of claim 14, wherein the controller is configured to change the magnetic polarity of at least one stage from the first electromagnetic field to the second electromagnetic field based on a position of the magnetic driver relative to the at least one stage during the return stroke.

* * * * *